(12) United States Patent
Sirejacob (10) Patent No.: US 11,732,404 B2
(45) Date of Patent: Aug. 22, 2023

(54) POACEAE FIBRES AND BUILDING PRODUCTS

(71) Applicant: PROFLUID IP B.V., Huizen (NL)

(72) Inventor: Gino Sirejacob, Evergem (BE)

(73) Assignee: Profluid IP B.V., Huizen (NL)

( * ) Notice: Subject to any disclaimer, the term of this patent is extended or adjusted under 35 U.S.C. 154(b) by 524 days.

(21) Appl. No.: 16/849,661

(22) Filed: Apr. 15, 2020

(65) Prior Publication Data
US 2020/0283950 A1 Sep. 10, 2020

Related U.S. Application Data

(63) Continuation-in-part of application No. PCT/IB2018/058005, filed on Oct. 16, 2018.

(30) Foreign Application Priority Data

Oct. 17, 2017 (EP) .................................. 17020476
Nov. 7, 2017 (EP) .................................. 17020522
Sep. 17, 2018 (NL) .................................. 2021653

(51) Int. Cl.
*D06M 15/643* (2006.01)
*C04B 16/10* (2006.01)
(Continued)

(52) U.S. Cl.
CPC ........... *D06M 15/643* (2013.01); *C04B 16/10* (2013.01); *C04B 28/182* (2013.01);
(Continued)

(58) Field of Classification Search
CPC ..... C04B 28/02; C04B 18/248; C04B 40/024; C04B 40/065; C04B 20/1051; C04B 24/42; C04B 18/24; C04B 16/10; C04B 2111/27; C04B 2111/52; C04B 28/182; C04B 40/0042; C04B 2111/28; C04B 2201/20; C04B 2201/30; D06M 13/507; D06M 15/53; D06M 15/643; D06M 2101/04; D06M 23/10; E01F 8/0029; E04B 2001/745; Y02W 30/91

See application file for complete search history.

(56) References Cited

U.S. PATENT DOCUMENTS 7,357,833 B2 4/2008 Cook et al.

FOREIGN PATENT DOCUMENTS

EP 2069255 A1 6/2009
EP 1558541 B1 9/2018
(Continued)

OTHER PUBLICATIONS

International Search Report dated Feb. 14, 2019 in Corresponding Application PCT/IB2018/058005 (2 pages).
(Continued)

*Primary Examiner* — Lynda Salvatore
(74) *Attorney, Agent, or Firm* — Hovey Williams LLP (57) ABSTRACT

Chemically modified unpyrolyzed Poaceae fibres having a length of less than 200 mm advantageously comprised between 2 and 100 mm, such as between 2 and 10 mm, said fibres having a water content of less than 40% by weight, and being treated with a treating aqueous dispersion comprising less than 1% by weight of surface treating mixture comprising at least a silanol terminated polydimethylsiloxane, as well as an amino coupling agent.

35 Claims, 2 Drawing Sheets

(51) Int. Cl.
    *C04B 28/18*     (2006.01)
    *C04B 40/00*     (2006.01)
    *D06M 13/507*     (2006.01)
    *D06M 15/53*     (2006.01)
    *D06M 23/10*     (2006.01)
    *C04B 111/52*     (2006.01)
    *D06M 101/04*     (2006.01)
    *E04B 1/74*     (2006.01)

(52) U.S. Cl.
CPC ....... *C04B 40/0042* (2013.01); *D06M 13/507* (2013.01); *D06M 15/53* (2013.01); *D06M 23/10* (2013.01); *C04B 2111/52* (2013.01); *D06M 2101/04* (2013.01); *E04B 2001/745* (2013.01)

(56) References Cited

FOREIGN PATENT DOCUMENTS

WO      2008040809 A1      4/2008
WO      2016146258 A1      9/2016

OTHER PUBLICATIONS

Hicran Acikel, "The use of miscanthus (*Giganteus*) as a plant fiber in concrete production", Scientific Research and Essays vol. 6(13), pp. 2660-2667, Jul. 4, 2011 (8 pages).

Hercules Fibers D5 Technical Bulletin #3 Alkali Resistance, Hercules Group SA (2 pages).

POACEAE FIBRES AND BUILDING PRODUCTS

RELATED APPLICATIONS

The present application is a Continuation in Part of PCT/IB2018/058005, filed on 16 Oct. 2018, and published on 25 Apr. 2019 under number WO2019/077486, claiming the benefit of the priority of European Patent Application 17020476.2 filed on 17 Oct. 2017 (abandoned), European Patent Application 17020522.3 filed on 7 Nov. 2017 and published on 24 Apr. 2019 under number EP3473605, and Dutch Patent Application NL2021653 filed on 17 Sep. 2018, published on 23 Apr. 2019 under number NL2021653 and granted on 10 Sep. 2019 under number NL2021653, the entire disclosures of which are incorporated herein by reference.

ABSTRACT OF THE DISCLOSURE

The present invention relates to the use of fibres in building products, said fibres being selected from the group Angiosperm, order Poales, Family Poaceae. More specifically the fibres are selected from the families: *Miscanthus, Pennisetum, Zea*. Mixtures of fibres are also suitable.

The State of the Art

It has already been tested to manufacture building products, like bricks, panels, insulating panels, etc. by mixing *Miscanthus* fibres with an aqueous cement slurry, and by hardening the so shaped products.

Researches have been made in order to improve the bonding between the fibres and the cement.

It has been proposed to soak the fibres in water, for achieving some water saturation in the fibres, so as to try to not disturb the hardening step. However, the soaking of the fibres prior mixing with cement slurry was not solving the problem of disturbing the hardening step. It was even observed that fibres were not correctly fixed with the binder, whereby affecting some mechanical property of the hardened product.

It has also been proposed to impregnated the fibres with cement or slag. The impregnation is not complete and surface remains uncovered. The binding of fibres with the impregnation product is not optimal. During the hardening, cracks appeared, possibly due to binding forces varying from place to place for a same fibre, and/or due concrete shrinkage.

It has also been proposed to impregnate the fibres with waterglass, so as to try to reduce the porosity of the fibres. However, said treatment was not effective for rendering the fibres not porous, as a large quantity of water was expelled within the week after the treatment. Moreover, a waterglass treatment of young plant fibres has shown some attacks of the cellulose, causing some splitting and causing decrease of mechanical properties varying on a more extended range. The so achieved plant fibres have thus heterogeneous properties.

It has also been suggested to coat the fibres with linseed oil. Such a treatment is affecting the bonding of the fibres with the cement binder.

Finally, it has further been suggested to heat treating the fibres so as to achieve for the fibres a reduction of water retention.

All said treatments were reducing the water absorption by the fibres, but were unable to inhibit water absorption with the time, whereby causing some problems for the hardening. Moreover, the so treated fibres were some ways degraded and had heterogeneous properties.

EP2069255 suggess to mix the fibres with some mineraliser, like lime, just before mixing it with the cement slurry. Such mineraliser has no true impact on the water adsorption of the fibres. No real improvement was achieved on long term. Treating fresh young plant fibres within a lime solution could modify the properties and/or integrity of the plant fibres.

A problem existing with the so treated *Miscanthus* fibres (as example of Poaceae fibres) is that the surface treatment and the fibres as such are affected with the time and storage conditions.

WO 2016/146258 discloses a process for producing a heat insulating panel, using plant based material treated by a hydrophobizing agent, before being dried and mixed to an aqueous binder. The plant material can be *Miscanthus* plant materials (without giving details thereof), while the hydrophobizing agent can be silane, siloxane, epoxy silane, aminosilane, silicate, potassium waterglass or sodium waterglass. The binder can resin binders, such as PU binders, but can also be mineral binders (with lime and/or cement or plaster). No specific examples of compositions are given. No specific example of treatment is disclosed. No suggestion is given in said prior art document how to solve the storage stability problem of the fibres.

When fibres of plant origin are used into a matrix, the ageing problem of the fibres is a first key problem to be solved, before the solving of the problem of binding of the plant fibres with the binder, which is also associated to possible chemical attacks of the binder on the plant fibres, which can lead to cracking of microfibrils surface.

The man skilled in the art has to test all possible fibre treatment for a plant species for determining the most efficient treatment of the fibres for its use with one specific binder.

Article "The use of *miscanthus* (*Giganteus*) as a plant fiber in concrete production" Hicran Acikel, Scientific Research and Essays Vol. 6(13), pp 2260-2267, 4 Jul. 2011 discloses concrete comprising plant fibres, such as *miscanthus* fibres. The *miscanthus* fibres which were tested had a length of 60 mm to 80 mm, a water absorption rate of about 110%.

From Table 2 of said article, it appears that the use of cut *Miscanthus* plant has a negative impact on the concrete properties. Said article suggests the use of cement rich concrete and the use of ground *Miscanthus* fibres.

However, in said article, the concrete sample were tested after a hardening period of 28 days, and not after a long period, with humidity.

When tested after a long period in humid atmosphere, it is observed that the concrete samples were not stable, that the binding between concrete and fibres was not decreasing, and that mechanical properties decrease to a level lower than the properties achieved with concrete prepared without *miscanthus* fibres.

U.S. Pat. No. 7,357,833 and its European corresponding patent EP1558541 relate to a cementitious material reinforced with chemically treated cellulose fibres. As stated in said documents, "it would be advantageous to be able to provide a cellulose fiber for admixture in cementitious materials which is resistant to structural degradation in the harsh alkaline environment of many cementitious mixtures, and which, therefore, is effective in reinforcement of the microenvironment around individual fibers and in preventing the initiation of microcracks."

In said documents, the cellulose fibres have to be treated with an aqueous polyvalent metal salt able to dissociate with the aqueous medium, such as Alun (aluminium sulfate). The treatment is operated for ensuring a precipitation of aluminium hydroxide. According to said patents, the so prepared fibres have an improved zero-span tensile (improved ZSSR). The fibres used are softwood and hardwood fibres, prepared by any pulping process. The fibres have thus to be first prepared so as to form a pulp, before being treated with Alun. The fibres are thus not fresh plant fibres. According to tests, it appeared that the water/cement ratio was more important than all said treatment and additives for achieving good compression strengths and/or other mechanical properties and/or for having good ageing resistance.

Leaflet "Hercules Fibers® D5, Technical Bulletin #3 Alkali Resistance" it is stressed that "New concrete is highly alkaline, typically with pH 12-13, which causes natural fibers to degrade within the concrete structure over time." Said leaflet stresses the importance of having cellulose fibres having specific ZSSR requirement.

Cellulosic fibres are in the form of a pulp and are not equivalent to *Miscanthus* fibres.

Shrinkage's were also observed with the hereabove disclosed treated and untreated *Miscanthus* fibres of the state of the art.

A wide use of *Miscanthus* fibres and other fibres, such as *Pennisetum* fibres (like *Pennisetum purpureum* fibres), in building products require to achieve products with quite predictable properties, despite some property variation due to the culture thereof, the weather conditions, the harvest, the cutting of the plants, the storage conditions, the storage time before mixing with the binder, ageing, insects attacks, fungi growth, bacteria growth, etc. Stable and predictable properties for stored Poaceae fibres for period of 6 months or more are a requirement for the industrial use thereof in facilities producing along all the seasons building products.

It has now been discovered that by selecting some specific treatment agents, it was possible to have better predictable mechanical properties for building products using fibres of the Angiosperm group, Poales order, Poaceae family, even when said fibres are stored for a period of more than 6 months. The treatment of the Poaceae fibres is thus a response to the problem of ageing and degradation, for example due to fungi growth, insects attacks, bacteria growth, etc.

BRIEF DESCRIPTION OF THE INVENTION

The present invention relates to specific fibres of the Angiosperm group, Poales order, Poaceae family, which have been treated so as to achieve storage stable fibres for 6 months and even more, said fibres being resistant to ageing and resistant to degradations, such as due to fungi, insects, and bacteria.

Angiosperm group, Poales order, Poaceae family (a group of well specific plants) comprises the following species:

*Achnatherum hymenoides, Aegilops squarrosa, Agropyron cristatum, Agropyron dasystachyum, Agropyron repens, Agropyron smithii, Agropyron subsecundum, Agropyron trichophorum, Agrostis alba, Agrostis gigantea, Agrostis palustris, Agrostis scabra, Agrostis stolonifera, Agrostis tenuis, Andropogon gerardii, Andropogon scoparius, Anthoxanthum odoratum, Aristida stricta, Arrhenatherum elatius, Arundinaria gigantea, Arundo donax, Avena sativa, Bouteloua curtipendula, Bouteloua gracilis, Bouteloua hirsuta, Brachypodium pinnatum, Brachypodium sylvaticum, Briza media, Bromus inermis, Bromus pumpellianus, Bromus tectorum, Calamagrostis canadensis, Calamagrostis epigejos, Calamagrostis inexpansa, Calamagrostis rubescens, Calamagrostis villosa, Cenchrus longispinus, Chasmanthium latifolium, Chasmanthium sessiliflorum, Cornucopiae cucullatum, Aegilops squarrosa, Cortaderia selloana, Ctenium aromaticum, Cymbopogon citratus, Cynodon dactylon, Dactylis glomerata, Danthonia intermedia, Danthonia parryi, Deschampsia cespitosa, Deschampsia flexuosa, Digitaria decumbens, Digitaria ischaemum, Distichlis spicata, Echinochloa colona, Echinochloa crus-galli, Ehrharta erecta, Elymus cinereus, Elymus elymoides, Elymus innovatus, Elymus junceus, Elymus mollis, Elymus virginicus, Elytrigia atherica, Eragrostis curvula, Festuca arundinacea, Festuca gigantea, Festuca halleri, Festuca idahoensis, Festuca ovina, Festuca pratensis, Festuca puccinellii, Festuca rubra, Festuca scabrella, Festuca scabriculmis, Festuca sylvatica, Helictotrichon pratense, Hilaria jamesii, Hilaria rigida, Holcus lanatus, Hordeum vulgare, Imperata cylindrica, Koeleria cristata, Lolium perenne, Lolium rigidum, Lycurus phleoides, Manisuris rugosa, Melica uniflora, Melinis minutiflora, Miscanthus sinensis, Molinia caerulea, Muhlenbergia richardsonis, Nardus stricta, Oryza sativa, Oryzopsis asperifolia, Panicum amarum, Panicum commutatum, Panicum maximum, Panicum obtusum, Panicum repens, Panicum texanum, Panicum virgatum, Paspalum dilatatum, Paspalum urvillei, Paspalum vaginatum, Paspalum wettsteinii, Pennisetum clandestinum, Pennisetum purpureum, Phalaris arundinacea, Phalaris tuberosa, Phleum pratense, Phragmites australis, Phragmites communis, Pleioblastus chino, Poa chaixii, Poa compressa, Poa pratensis, Poa secunda, Puccinellia maritima, Puccinellia phryganodes, Saccharum officinarum, Sasa nipponica, Secale cereale, Setaria geniculata, Setaria italica, Setaria magna, Setaria sphacelata, Sorghastrum nutans, Sorghum bicolor, Sorghum halepense, Spartina alterniflora, Spartina anglica, Spartina cynosuroides, Spartina patens, Sporobolus cryptandrus, Stipa comata, Stipa richardsonii, Stipa spartea, Stipa viridula, Trichachne californica, Tripsacum dactyloides, Triticosecale* spp., *Triticum aestivum, Triticum boeoticum, Triticum dicoccoides, Triticum percicumx, Uniola paniculata, Zea mays, Zizania aquatica,* and *Zoysia japonica.*

In all said species, the followings are preferred *Miscanthus*-like species, *Pennisetum*-like species, and *Zea*-like species.

In the present specification, Poaceae fibres means fibres of plant(s) belonging to the Angiosperm group, Poales order, Poaceae family, and can be for example fibres of one of the various species listed hereabove. However, *Miscanthus*-like species, *Pennisetum*-like species, and *Zea*-like species are preferred.

In the present specification Poaceae plant means plants belonging to the Angiosperm group, Poales order, Poaceae family and can be for example a plant of one of the various species listed hereabove. However, *Miscanthus*-like species, *Pennisetum*-like species, and *Zea*-like species are preferred.

While not being bound to any theory, it is expected that the treated Poaceae fibres (especially fibres from the *Miscanthus*-like species, *Pennisetum*-like species, and *Zea*-like species) have some further silicon grafted to the fibres, said grafted silicon acting as a bridge between silicon atoms of the natural fibres and or for the added coupling agent, suitable for further binding with the silicon containing hydraulic binder.

Still, while not being bound to any theory, it is expected that the treated Poaceae fibres (especially fibres from the *Miscanthus*-like species, *Pennisetum*-like species, and *Zea*- like species) have some further silicon grafted to the fibres, said grafted silicon acting as means for enabling the treated fibres to be resistant to insect attacks, fungi growth and bacteria growth.

A first object of the invention is Poaceae fibres (especially fibres from the *Miscanthus*-like species, *Pennisetum*-like species, and *Zea*-like species) enabling to achieve a better predictable mechanical properties and/or improved mechanical properties and/or improved processability, even after a storage period of more than 6 months in an atmosphere with a relative humidity of 50%. The fibres of the invention are storage stable, resistant to insects and to fungi/bacteria growth, and resistant to ageing, enabling the use of the fibres in industrial plants all along the year.

The Poaceae fibres (especially fibres from the *Miscanthus*-like species, *Pennisetum*-like species, and *Zea*-like species) of the invention are chemically modified unpyrolyzed Poaceae fibres (especially fibres from the *Miscanthus*-like species, *Pennisetum*-like species, and *Zea*-like species) having a length of less than 200 mm, such as comprised between 2 and 100 mm, especially such as from 2 to 10 mm, said fibres having a water content of less than 20% by weight, and being treated with a treating aqueous dispersion comprising less than 1% by weight of surface treating mixture comprising at least a a hydroxy (OH) terminated polydimethylsiloxane having a molecular weight comprised between 200 and 1000, as well as an amino coupling agent.

For the property of OH terminated silanol terminated polydimethylsiloxane, reference can be made to property available on the web with reference CAS: 70131-67-8.

The fibres have advantageously a length comprised between 2 and 6 mm and a water content of less than 20% by weight, preferably less than 10% by weight. Preferably 90% by weight of the fibres have a length comprised between 2 and 6 mm Most preferably the fibres are substantially free from fibres with a length of 1 mm or less than 1 mm. In preferred embodiments, the fibres comprise in dry matter less than 2% by weight of fibres or particles with a size or length of less than 2 mm. Without being bound to any theory, it seems that the presence of fibres with a size of less than 2 mm in concrete have a negative influence on the mechanical properties, possibly a completed embedding of the small particles with entrapped water, whereby forming singular voids within the concrete and/or zone with lower adhesion and/or initialising zones for cracks or microcracks.

The amino coupling agent is advantageously an amino silane coupling agent, preferably an aminoethyl aminopropyl trimethoxysilane. Details of the properties of the preferred aminoethyl aminopropyl trimethoxysilane can be found on the web by using the CAS reference number: 1760-24-3.

The surface treating mixture advantageously further comprises a polyethylene glycol ether, especially a polyethylene glycol trimethylnonyl ether. Details of the properties of the preferred polyethylene glycol trimethylnonyl ether can be found on the web by using the CAS reference number: 60828-78-6

Preferably 99% or more than 99% of the weight of the preferred surface treating mixture consists of alcohol, water, polyethylene glycol ether, hydroxyl terminated polydimethylsiloxane and aminoethyl aminopropyl trimethoxysilane.

The treating aqueous mixture or dispersion comprises an alcohol, advantageously ethanol.

The treating aqueous mixture or dispersion applied on the Poaceae fibres has for example a temperature from 15° C. up to 50° C. Said treatment can be operated at room temperature, especially at temperature from 20° C. up to 30° C.

The weight ratio silanol terminated polydimethylsiloxane with a molecular weight comprised between 200 and 1000/amino coupling agent is preferably comprised between 5:1 and 20:1.

The said chemically modified unpyrolyzed ageing resistant fibres of the invention are holding during its storage for 6 months (and even more, such as 9-12 months), an alkali resistance in a 1 N NaOH solution of more than 92% for at least 28 days (advantageously at least 40 days, and even more preferably at least 56 days), in which the said chemically modified unpyrolyzed ageing resistant fibres after complete burning at 600° C. have an ash characterised by a $SiO_2$ weight content comprised between 41% and 70% and a $K_2O$ weight content comprised between 4% and 24%, while the $SiO_2+K_2O$ weight content of said ash is comprised between 68% and 85%.

The fibres before being treated have a silicon content as $SiO_2$ in the ash (after complete burning at 600° C.) comprised between 30 and 40% by weight.

The Poaceae fibres (especially fibres from the *Miscanthus*-like species, *Pennisetum*-like species, and *Zea*-like species) are advantageously sprayed with the aqueous treated mixture, then mixed and dried.

The fibres are *Miscanthus* fibres, said *Miscanthus* fibres before being treated a silicon being selected in *Miscanthus* fibres having after complete burning at 600° C. an ash characterized by a $SiO_2$ content higher than 30% by weight, advantageously comprised between 30 and 40% by weight, whereby said fibres are treated with said treating aqueous dispersion, so as to enrich the fibres in silicium, so that the ash of the treated fibres after complete burning at 600° C. comprises more than 40% by weight $SiO_2$, especially from 55 to 70% by weight $SiO_2$.

Preferred Poaceae fibres (especially fibres from the *Miscanthus*-like species, *Pennisetum*-like species, and *Zea*-like species) of the invention are fibres enriched in silicon, so that the ash of the fibres after complete burning at 600° C. comprises more than 40% by weight $SiO_2$, especially from 41 to 60% by weight $SiO_2$. Especially, the ash of the fibres after complete burning at 600° C. are characterized by a weight $SiO_2$ weight content of 41 to 70% (such as from 41 to 50% for *Miscanthus*-like species and 57-70% for *Pennisetum*-like species and *Zea*-like species) and a $K_2O$ weight content of 5 to 24% (such as from 18 to 24% for *Miscanthus*-like species, 9 to 10% for *Pennisetum*-like species and 4-5% for *Zea*-like species).

the ash of the fibres after complete burning at 600° C. are characterized by a weight $SiO_2$ content of 41 to 70% and a $K_2O$ weight content of 9 to 24%.

The Poaceae fibres have, after complete burning an ash characterized with a $SiO_2$ weight content+$K_2O$ weight content advantageously comprised between 68% and 85%.

The selected fibres are advantageously Poaceae fibres when harvested having after complete burning at 600° C. a $P_2O_5$ weight content in the ash comprised between 3 and 7%.

The fibres after being treated with the aqueous treating aqueous dispersion (for example at a temperature of 15 to 30° C.) are dried again (for example air drying at temperature of less than 100° C., such as from 50° C. to 80° C.) up to a water content of less than 20% by weight, preferably less than 10% by weight.

According to preferred embodiments of fibres of the invention, the fibres have one or more of the following characteristics:

in dry form, 98% by weight of the fibres have a length comprised between 2 and 10 mm.

The amino coupling agent is an amino silane coupling agent.

The amino coupling agent is an aminoethyl aminopropyl trimethoxysilane.

The surface treating mixture further comprises a polyethylene glycol ether.

The polyethylene glycol ether is a polyethylene glycol trimethylnonyl ether.

The treating aqueous dispersion comprises an alcohol, most preferably ethanol.

The fibres are *Miscanthus* fibres, whereby, before being treated with the treating aqueous dispersion, said *Miscanthus* fibres are selected from fresh *Miscanthus* fibres having after complete burning at 600° C. an ash characterized by a $SiO_2$ content higher than 30% by weight, whereby said fresh *Miscanthus* fibres after being treated with said treating aqueous dispersion and after being dried, are treated fibres enriched in silicon, so that, after complete burning at 600° C., the ash of the treated fibres enriched in silicon comprises more than 40% by weight $SiO_2$.

The fibres are *Miscanthus* fibres, whereby, before being treated with the treating aqueous dispersion, said *Miscanthus* fibres are selected from fresh *Miscanthus* fibres having after complete burning at 600° C. an ash characterised by a $SiO_2$ content higher than 30% by weight, preferably between 30 and 40% by weight, whereby said fresh *Miscanthus* fibres after being treated with said treating aqueous dispersion and after being dried, are treated fibres enriched in silicon, so that, after complete burning at 600° C., the ash of the treated fibres enriched in silicon comprises from 55 to 70% by weight $SiO_2$.

The fibres comprise in dry matter less than 2% by weight of fibres or particles with a size or length of less than 2 mm.

In dry form, more than 98% by weight of the fibres have a length comprised between 2 mm and 6 mm.

After complete burning at 600° C., the ash of the treated fibres corresponds to 3 to 4% by weight of the dried treated fibres before their burning, said ash being characterised by a $SiO_2$ weight content comprised between 57% and 70% and by a $SiO_2+K_2O$ weight content comprised between 70% and 78%.

The fibres are treated *Miscanthus* fibres, in which after complete burning at 600° C., the ash of the treated fibres corresponds to 3 to 3.2% by weight of the dried treated fibres before their burning, said ash being characterised by a $SiO_2$ weight content comprised between 57% and 60% and by a $SiO_2+K_2O$ weight content comprised between 70% and 78%.

The Poaceae fibres (especially fibres from the *Miscanthus*-like species, *Pennisetum*-like species, and *Zea*-like species) of the invention have advantageously a weak acid content of less than 10% by weight and a high polyvalent silicon metal content of more than 0.5% by weight, such as from 1% up to 10% by weight. It is expected that that the treated Poaceae fibres (especially fibres from the *Miscanthus*-like species, *Pennisetum*-like species, and *Zea*-like species) are protected from degradative attacks for the fibre structure, especially in alkaline environments.

For determining the long-term stability of fibres of the invention, fibres of the invention were treated after different storage time in an air environment having a temperature of about 20° C. and a relative humidity of 50%.

In said test 100 g fibres of the invention were dried so as to reduce the free water content to 10%. Said dried fibres were soaked in 1 litre of 1N NaOH (aqueous solution) at a temperature of 20° C. for 1 day, 7 days, 14 days, 28 days and 56 days. After the different soaking period, the fibres were collected, washed with water up to achieve a pH of about 7, and dried with hot air at a temperature of 70° C. for 60 minutes. The so dried fibres were then weighted.

Said test is operated for fibres after a storage period of 7 days, for fibres after a storage period of 60 days, and for fibres after a storage period of 180 days.

It was observed that with the fibres of the invention, the dry weight of the fibres stored 7 days, 60 days and 180 days was varying in a very limited range (2 to 3%); even after a soaking time of 56 days in NaOH solution, said dry weight of the fibres is still greater than 92% (advantageously greater than 95%) of the dry weight of the dry fibres of the invention not soaked in the NaOH solution. The fibres of the invention have thus an excellent resistance against the alkaline concrete medium.

Said test is showing the extreme good stability of the fibres of the invention, even after a long storage period, meaning for the user a good awareness of the properties he can achieve despite a variable storage time.

Such a good time stability in a NaOH solution means also that the fibres will also be stable within a concrete matrix with the time, especially during the hardening period of the concrete.

The stability of the fibres of the invention can also be measured or determined by using known tests for determining stability of cellulose fibres in alkaline environments, such as the tests disclosed in U.S. Pat. No. 7,357,833, columns 12 to 16 (see also its European Equivalent: EP1558541B1, paragraphs 0066 to 0078). The disclosure of these tests are incorporated hereto by reference in its entirety.

The said tests disclosed for cellulose fibres in U.S. Pat. No. 7,357,833 are applied to treated Poaceae fibres (especially fibres from the *Miscanthus*-like species, *Pennisetum*-like species, and *Zea*-like species).

For said tests, the treated Poaceae fibres (especially fibres from the *Miscanthus*-like species, *Pennisetum*-like species, and *Zea*-like species) are dried up to a moisture content of 6 to 8%. The treated fibres are then submitted to a stability test in strong alkaline environment, namely 1N NaOH medium. For the testing samples, 60 g dried treated Poaceae fibres (especially fibres from the *Miscanthus*-like species, *Pennisetum*-like species, and *Zea*-like species) were mixed in 200 g 1N NaOH solution (temperature 20° C.). The testing samples were respectively treated for 1 day, 3 days, 14 days and 28 days. For making comparison, untreated Poaceae fibres (especially fibres from the *Miscanthus*-like species, *Pennisetum*-like species, and *Zea*-like species) (dried up to a moisture content of 6 to 8%) were treated in the same ways.

After the alkaline soaking/testing time, the Poaceae fibres (especially fibres from the *Miscanthus*-like species, *Pennisetum*-like species, and *Zea*-like species) were collected, washed with water, up to achieving a pH of about 7 for the Poaceae fibres (especially fibres from the *Miscanthus*-like species, *Pennisetum*-like species, and *Zea*-like species) mixed into the water.

As explained in U.S. Pat. No. 7,357,833, the Zero-Span Breaking Strength of the fibres or the dry zero-spah tensile is determined for each sample treated with NaOH. For said testing, a handsheeting apparatus TAPPI T 205 with the tensile tester TAPPI T 231 was used.

The Zero-Span Stability Ratio (ZSSR) was determined for each sample, said ratio being the ratio (zero-span tensile for the Poaceae fibres (especially fibres from the *Miscanthus*-like species, *Pennisetum*-like species, and *Zea*-like species) of the invention after resting/soaking in the NaOH solution for a specific time period)/(zero-span tensile for the Poaceae fibres (especially fibres from the *Miscanthus*-like species, *Pennisetum*-like species, and *Zea*-like species) of the invention not mixed to or soaked into a NaOH solution). Stability ratio of more than 92% could be achieved for fibres of the invention, after a soaking time of 7 days or more, even after 28 days soaking in 1N NaOH.

The chemically modified Poaceae fibres (especially fibres from the *Miscanthus*-like species, *Pennisetum*-like species, and *Zea*-like species) of the invention have advantageously a treated fibre alkaline stability improvement (TFSAI) of more than 1.15 even after 28 days soaking in 1N NaOH. Said TFSAI (MW) is the ratio between the average (in weight) molecular weight of the chemically modified fibre of the invention after soaking in NaOH for a selected time, and the average in weight of the non chemically modified Poaceae fibres (especially fibres from the *Miscanthus*-like species, *Pennisetum*-like species, and *Zea*-like species) after soaking in NaOH for the selected time.

Said ratio TFSAI (V) can also be determined based on the viscosity of the mix fibres (of the invention and not of the invention) and 1N NaOH solution, after a soaking time in NaOH solution. The ratio viscosity of chemically modified fibre in 1N NaOH after a selected soaking time/viscosity of untreated Poaceae fibres (especially fibres from the *Miscanthus*-like species, *Pennisetum*-like species, and *Zea*-like species) in 1N NaOH after said selected soaking time is advantageously greater than 1.1 after a soaking time of 7 days or more than 7 days, even after a soaking time of 28 days.

Advantages/properties of the preferred Poaceae fibres (especially fibres from the *Miscanthus*-like species, *Pennisetum*-like species, and *Zea*-like species) of the invention are among other:
   low specific weight
   production requires little energy and fertilizer
   large carbon content
   low investment cost
   friendly processing, no skin irritation
   treatment enables predictable properties
   treatment enables control of the moisture absorption
   treatment controls durability
   insect repulsive
   reduced water absorption of less than 100% of the weight of the dry coated fibres of the invention, preferably of less than 75%, more preferably comprised between 10% and 50% of the weight of the dry coated fibres (the water absorption can be determined as follows: a) drying of the coated fibres for 1 hour at 100-105° C.; b) weighting of the dried fibres; c) wetting of the fibres, by immersing the fibres in water (20° C.) for 10 minutes; d) removing the excess water by shaking; and e) weighting the wetted fibres. The water absorption is equal to the weight of the wetted fibres minus the weight of the dry fibres. Expressed in % of the dry weight, the water absorption is equal to [the weight of the wetted fibres minus the weight of the dry fibres] divided by the weight of the dry fibres.
   treated fibres act as means for insulation and providing some fire-resistant properties
   fire resistant
   resistant to fungi growth
   the fibres are cut fibres provided with a thin silicon containing coating with a thickness of less than 10 μm, the said coating comprising at least (but advantageously principally) aminosilane and polydimethylsiloxane and reaction products of aminosilane and polydimethylsiloxane
   long term Alkali resistant (said resistance can be determined as follows: 100 g fibres of the invention were dried so as to reduce the free water content to 10%. Said dried fibres were soaked in 1 litre of 1N NaOH (aqueous solution) at a temperature of 20° C. for 1 day, 7 days, 14 days, 28 days and 56 days. After the different soaking period, the fibres were collected, washed with water up to achieve a pH of about 7, and dried with hot air at a temperature of 70° C. for 60 minutes. The so dried fibres were then weighted. Said test is operated for fibres after a storage period of 7 days, for fibres after a storage period of 60 days, and for fibres after a storage period of 180 days.

It was observed that with the fibres of the invention, the dry weight of the fibres stored 7 days, 60 days and 180 days was varying in a very limited range (2 to 3%), even for soaking time of 56 days, said dry weight being moreover always greater than 92% (advantageously greater than 95%) of the dry weight of the dry fibres of the invention not soaked in the 1N NaOH solution.
   excellent stability with respect to the untreated fibres (ZSSR of more than 92% after 28 days soaking in 1N NaOH, TFSAI (MW) and (Viscosity) of more than 1.1 even after a soaking time of 28 days.

The invention relates also to a dry ready to use mix after addition of water, said mix comprising a silicon containing hydraulic binder and Poaceae fibres (especially fibres from the *Miscanthus*-like species, *Pennisetum*-like species, and *Zea*-like species) of the invention, as disclosed here above. The weight ratio hydraulic binder/Poaceae fibres (especially fibres from the *Miscanthus*-like species, *Pennisetum*-like species, and *Zea*-like species) is advantageously comprised between 0.5 and 10.

The dry mix is preferably comprising one or more of the following characteristics:
   A dry binder mix which is ready to use after addition of water, said mix comprising at least (A) a silicon containing hydraulic binder and (B) chemically modified unpyrolyzed ageing resistant fibres from the group consisting of *Miscanthus*-like species, *Pennisetum*-like species, *Zea*-like species and mixtures thereof, said fibres having a length comprised between 2 and 100 mm, said ageing resistant fibres having a water content of less than 20% by weight, said chemically modified unpyrolyzed ageing resistant fibres having a coating obtained (*) by contacting the fibres with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and (*) by drying the fibres contacted with the said treating aqueous dispersion;
   whereby the coating of the chemically modified unpyrolyzed ageing resistant fibres comprises at least (a) aminosilane bound to silicon atoms present in the fibres and (b) polydimethylsiloxane bound to aminosilane group via a silanol group,
   whereby the weight ratio between the OH-terminated silanol terminated polydimethylsiloxane having a molecular weight comprised between 200 and 1000 and the amino silane coupling agent of the surface treating mixture is comprised between 5:1 and 20:1, the said chemically modified unpyrolyzed ageing resistant fibres keeping during a storage period for 6 months in an air environment having a temperature of about 20° C. and a relative humidity of 50%, an alkali resistance
in a 1 N NaOH solution for at least 28 days of more than 92%, in which the said chemically modified unpyrolyzed ageing resistant fibres after complete burning at 600° C. have an ash characterised by a $SiO_2$ weight content comprised between 41% and 70% and a $K_2O$ weight content comprised between 4% and 24%, while the $SiO_2+K_2O$ weight content of said ash is comprised between 68% and 85%.

The mix in which in dry form, more than 98% by weight of the chemically modified unpyrolysed ageing resistant fibres have a length comprised between 2 mm and 10 mm.

The mix in which the amino coupling agent is aminoethyl aminopropyl trimethoxysilane.

The mix in which the chemically modified unpyrolyzed ageing resistant fibres are chemically modified unpyrolyzed *Miscanthus* fibres, whereby, before being treated with the treating aqueous dispersion, said *Miscanthus* fibres are selected from fresh *Miscanthus* fibres having after complete burning at 600° C. an ash characterised by a $SiO_2$ content higher than 30% by weight, whereby said fresh *Miscanthus* fibres after being treated with said treating aqueous dispersion and after being dried, are treated fibres enriched in silicon, so that, after complete burning at 600° C., the ash of the treated fibres enriched in silicon comprises from 55 to 70% by weight $SiO_2$.

before being treated with the treating aqueous dispersion, the *Miscanthus* fibres are selected from fresh *Miscanthus* fibres having after complete burning at 600° C. an ash characterised by a $SiO_2$ content comprised between 30 and 40% by weight.

in dry form, more than 98% by weight of the chemically modified unpyrolyzed fibres have a length comprised between 2 mm and 6 mm.

after complete burning at 600° C., the ash of the chemically modified unpyrolyzed fibres corresponds to 3 to 4% by weight of the dried chemically unpyrolyzed fibres before their burning, said ash being characterised by a $SiO_2$ weight content comprised between 57% and 70% and by a $SiO_2+K_2O$ weight content comprised between 70% and 78%.

The chemically modified unpyrolyzed fibres are chemically modified unpyrolyzed *Miscanthus* fibres, in which after complete burning at 600° C., the ash of the chemically modified unpyrolyzed fibres corresponds to 3 to 3.2% by weight of the dried chemically modified unpyrolyzed fibres before their burning, said ash being characterised by a $SiO_2$ weight content comprised between 57% and 60% and by a $SiO_2+K_2O$ weight content comprised between 70% and 78%.

The invention relates also to a building product comprising at least a part or layer comprising a hardened silicon containing hydraulic binder containing Poaceae fibres (especially fibres from the *Miscanthus*-like species, *Pennisetum*-like species, and *Zea*-like species) of the invention.

It has been observed that an extremely high binding was achieved between the silicon containing hydraulic binder and the Poaceae fibres (especially fibres from the *Miscanthus*-like species, *Pennisetum*-like species, and *Zea*-like species) of the invention. Said building product was stable, had a low water adsorption, a high heat insulating coefficient, a good burning/fire resistance, a low level of shrinkages, excellent sound insulation properties, etc. It seems that some of the good properties of the building product of the invention is due to the presence of voids within the building product (at least partly due to the voids within the fibres incorporated into a matrix), and/or due some fossilisation of the Poaceae fibres (especially fibres from the *Miscanthus*-like species, *Pennisetum*-like species, and *Zea*-like species) within the matrix (with expected formation of some carbon black particles when submitted to a fire test). While not being bound to any theory, the fact that Poaceae fibres (especially fibres from the *Miscanthus*-like species, *Pennisetum*-like species, and *Zea*-like species) comprises some chlorine atom (more than about 0.1% by weight with respect to treated Poaceae fibres (especially fibres from the *Miscanthus*-like species, *Pennisetum*-like species, and *Zea*-like species)), said chlorine atoms being well fixed to the fibres due to the treatment, the treated Poaceae fibres (especially fibres from the *Miscanthus*-like species, *Pennisetum*-like species, and *Zea*-like species) do not disturb the hardening step, while providing fire resistance for the Poaceae fibres (especially fibres from the *Miscanthus*-like species, *Pennisetum*-like species, and *Zea*-like species).

It is expected that at least part of the excellent properties (stability, mechanical, fire resistance, vibration resistance, earthquake resistance, etc.) of the building product of the invention is due to the presence of silicon, potassium and phosphorus within the Poaceae fibres (especially fibres from the *Miscanthus*-like species, *Pennisetum*-like species, and *Zea*-like species) and due to the excellent binding of a specific thin coating on said cut fibres.

The hardened silicon containing hydraulic binder is a calcium based or containing silicon containing hydraulic binder, especially a calcium alumino silicon containing hydraulic binder, such as cement, concrete.

Advantageously, the calcium based or containing hydraulic binder is mixed with water comprising less than 0.5% by weight a polydiethoxysiloxane, advantageously a fluoro C1 to C10-alkyl polydiethoxysiloxane, and a butyl and/or octyl triethoxysilane. It has been shown that the use of said additives still improve the properties and stability of the building product of the invention. "fluoro C1 to C10-alkyl" means "fluoro alkyl radicals comprising 1 to 10 carbon atoms, such as 2 to 5 carbon atoms". The fluoro alkyl radical comprises advantageously more than one fluoro atom. As specific radical, reference can be made to ethyl, butyl or propyl radicals provided with 3 or more than 3 fluoro atoms, such as 5 and 7 fluoro atoms. (C1 to C10 is used as meaning compound or radical containing 1 to 10 carbon atoms)

The invention relates further to a method for the preparation of a building product according to the invention, in which at least Poaceae fibres (especially fibres from the *Miscanthus*-like species, *Pennisetum*-like species, and *Zea*-like species) of the invention, a hardenable calcium containing hydraulic binder (preferably a cement containing binder), and water are mixed together, and hardened, advantageously at a temperature greater than 20° C. The binder comprises also advantageously some silicon, such as issued from the reaction of $SiO_2$ containing compounds, like $SiO_2$.

Advantageously, the mixture is shaped and hardened under a temperature comprised between 100° C. and 250° C. and under a pressure of $3\times10^5$ and $20\times10^5$ Pa for at least 60 minutes.

The silicon containing hydraulic binder is a calcium containing aluminosilicate binder or an alumino silicate cement or a Portland cement or an alumino enriched Portland cement.

The binder is preferably mixed with one or more water repellent agents, such as fluoro compounds, as well as with one or more further additives, such SiO$_2$ particles, Alumine particles, silicate, aluminosilicate particles, fillers, etc.

As advantageous additives to be mixed to the binder, before its hardening, reference can be made to the use of an aqueous emulsion containing:

A) polysiloxane "A" being a polymer or a copolymer having a weight average molecular weight comprised between 500 and 2000 g/mol, preferably comprised between 600 and 1400 g/mol, said polymer or copolymer being formed by the polymerisation of units of the following general formula:

$(R_1)_x Si(OR_2)_y (OH)_z O_{(4-x-y-z)/2}$ with R$_1$, which are different or the same as: alkyl group met 1 to 10 carbon atoms, which is possibly substituted by one or more halogen atoms and/or NH$_2$ groups;

R$_2$, which is C$_2$H$_5$;

x having in average a value comprised between 1.0 and 2.0 y having in average a value comprised between 0.7 and 2.0 z having in average a value of less than or equal to 1.0 with the proviso that x+y+z< or =3.0, in which this polysiloxane has advantageously a dynamic viscosity of less than 2000 mPa·s, B) alkyl alkoxysilane "B" selected from the group consisting of iso-octyl triethoxysilane, iso butyl triethoxysilane, n-octyl triethoxysilane and mixtures thereof, C) an emulsifying agent by means of which the polysiloxane and the alkylalkoxysilane are finely dispersed as particles with a size of less than 1 micron in the water, in which the weight ratio between, on the one hand, the alkyl alkoxysilane "B" selected from the group consisting of iso-octyl triethoxysilane, iso butyl triethoxysilane, n-octyl triethoxysilane and mixtures thereof, and on the other hand the polysiloxane "A" is between 21 and 40, in which the aqueous emulsion has a dynamic viscosity smaller than 10 mPa·s, preferably smaller than 5 mPa·s, and in which the quantity of aqueous emulsion used in the manufacture of the water repellent products is such that the dry weight content of polysiloxane "A" and alkyl alkoxysilane "B" in the water repellent products after the hardening of the calcium containing hydraulic binding agent is comprised between 0.03% and 0.5%, preferably between 0.05% and 0.4%, most preferably between 0.1% and 0.2%.

A preferred method for the preparation of a building product of the invention comprises at least the steps of:

mixing together at least (A) chemically modified unpyrolyzed ageing resistant fibres selected from the group consisting of *Miscanthus*-like species, *Pennisetum*-like species, *Zea*-like species and mixtures thereof, said fibres having a length comprised between 2 and 100 mm, said ageing resistant fibres having a water content of less than 20% by weight, said ageing resistant fibres having a coating obtained (*) by contacting the fibres with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and (*) by drying the fibres contacted with the said treating aqueous dispersion;

whereby the coating of the ageing resistant the fibres comprises at least (a) aminosilane bound to silicon atoms present in the fibres and (b) polydimethylsiloxane bound to aminosilane group via a silanol group, whereby the weight ratio between the OH-terminated silanol terminated polydimethylsiloxane having a molecular weight comprised between 200 and 1000 and the amino silane coupling agent of the surface treating mixture is comprised between 5:1 and 20:1, the said chemically modified unpyrolyzed ageing resistant fibres keeping during a storage period for 6 months in an air environment having a temperature of about 20° C. and a relative humidity of 50%, an alkali resistance in a 1 N NaOH solution for at least 28 days of more than 92%, in which the said chemically modified unpyrolyzed ageing resistant fibres after complete burning at 600° C. have an ash characterised by a SiO$_2$ weight content comprised between 41% and 70% and a K$_2$O weight content comprised between 4% and 24%, while the SiO$_2$+K$_2$O weight content of said ash is comprised between 68% and 85%, (B) a hardenable calcium-containing hydraulic binder, and (C) water, to form a hardenable fibres containing mixture; and hardening the said hardenable fibres containing mixture at a temperature greater than 20° C.

Most preferably, said method further comprises the step of:

shaping the hardenable fibres containing mixture to form a shaped hardenable fibres containing mixture, before hardening the shaped hardenable fibres containing mixture at a temperature comprised between 100° C. and 250° C. and under a pressure of 3×10$^5$ and 20×10$^5$ Pa, advantageously for at least 60 minutes.

The invention further relates to a method for preparation of stabilized Poaceae fibres (especially fibres from the *Miscanthus*-like species, *Pennisetum*-like species, and *Zea*-like species) suitable for the preparation of building product of the invention, in which:

fresh Poaceae (especially from the *Miscanthus*-like species, *Pennisetum*-like species, and *Zea*-like species) plant comprising the fibres to be treated are harvested when the fresh fibres of the fresh plant have after complete burning at 600° C. a silicon weight content measured as SiO$_2$ in the ash of at least 30%, said fresh Poaceae (especially from the *Miscanthus*-like species, *Pennisetum*-like species, and *Zea*-like species) plant having a water content of less than 30% by weight (possibly after a partial drying), whereby said fresh Poaceae (especially from the *Miscanthus*-like species, *Pennisetum*-like species, and *Zea*-like species) plant are cut into fibres with a length comprised between 2 mm and 10 mm;

optional drying of the Poaceae fibres (especially fibres from the *Miscanthus*-like species, *Pennisetum*-like species, and *Zea*-like species) at a temperature of less than 75° C., preferably less than 60° C., so as to reduce the water content to less than 20% by weight;

treating the Poaceae fibres (especially fibres from the *Miscanthus*-like species, *Pennisetum*-like species, and *Zea*-like species) with an aqueous dispersion comprising less than 1% by weight of a mixture comprising OH terminated silanol terminated polydimethylsiloxane having a molecular weight comprised between 200 and 1000, an aminosilane coupling agent, and advantageously a polyethylene glycolether;

drying of the treated Poaceae fibres (especially fibres from the *Miscanthus*-like species, *Pennisetum*-like species, and *Zea*-like species) so as to reduce the water weight content to less than 20%, preferably to less than 10%, and optional storage of the treated fibres in an air environment with a temperature from 0° C. up to 50° C. and a relative humidity of less than 2 mm.

Advantageously the method comprises a step for removing from fibres to be treated or treated fibres, at least partly fibres and particles having a length or size of less than 2 mm Preferably, the method comprises a step for removing small particles or fibres before the treatment with the aqueous dispersion, as well as after the said treatment.

It has been observed that when treating fibres comprising a substantial quantity of small fibres or particles, the mechanical properties were lowered with respect to the properties achieved on fibres substantially free from small particles or fibres with a size of less than 2 mm.

A preferred method for preparation of chemically modified unpyrolyzed ageing resistant fibres of the invention selected from the group consisting of *Miscanthus*-like species, *Pennisetum*-like species, *Zea*-like species and mixtures thereof, said fibres having a length comprised between 2 mm and 100 mm, said ageing resistant fibres having a water content of less than 20% by weight, said ageing resistant fibres having a coating obtained (*) by contacting the fibres with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and (*) by drying the fibres contacted with the said treating aqueous dispersion up to a water content of less than 20% by weight;

whereby the coating of the ageing resistant the fibres comprises at least (a) aminosilane bound to silicon atoms present in the fibres and (b) polydimethylsiloxane bound to aminosilane group via a silanol group, whereby the weight ratio between the OH-terminated silanol terminated polydimethylsiloxane having a molecular weight comprised between 200 and 1000 and the amino silane coupling agent of the surface treating mixture is comprised between 5:1 and 20:1, the said chemically modified unpyrolyzed ageing resistant fibres keeping during a storage period for 6 months in an air environment having a temperature of about 20° C. and a relative humidity of 50%, an alkali resistance in a 1 N NaOH solution for at least 28 days of more than 92%, in which the said chemically modified unpyrolyzed ageing resistant fibres after complete burning at 600° C. have an ash characterised by a $SiO_2$ weight content comprised between 41% and 70% and a $K_2O$ weight content comprised between 4% and 24%, while the $SiO_2+K_2O$ weight content of said ash is comprised between 68% and 85%, said method comprising at least the following steps:

determining, after complete burning at 600° C., an average $SiO_2$ content of the ash of at least one sample of fresh fibres containing plant parts from plants selected from the group consisting of *Miscanthus*-like species, *Pennisetum*-like species, *Zea*-like species and mixtures thereof, intended to be harvested, in case the determined average $SiO_2$ content of said ash of said at least one sample of fresh fibres containing plant parts from plants selected from the group consisting of *Miscanthus*-like species, *Pennisetum*-like species, *Zea*-like species and mixtures thereof, is greater than 30% by weight, harvesting fresh fibres containing plant parts;

cutting said fresh fibres containing plant parts into plant fibres with a length comprised between 2 mm and 100 mm;

drying the cut plant fibres at a temperature of less than 75° C., so as to obtain dried plant fibres with a water content of less than 20% by weight;

treating the dried plant fibres with an aqueous dispersion comprising less than 1% by weight of a surface treating mixture comprising OH terminated silanol terminated polydimethylsiloxane having a molecular weight comprised between 200 and 1000, an aminosilane coupling agent, and a polyethylene glycolether, in which the weight ratio between the OH-terminated silanol terminated polydimethylsiloxane having a molecular weight comprised between 200 and 1000 and the amino silane coupling agent of the surface treating mixture is comprised between 5:1 and 20:1, so as to obtained humid coated plant fibres;

drying of the humid coated plant fibres for obtaining chemically modified unpyrolyzed ageing resistant fibres with a water content of less than 20% by weight.

Most preferably, the method further comprises a step of cutting the fresh fibres into cut plant fibres with a length of less than 10 mm, and a step for removing from the cut plant fibres, the cut plant fibres with a length of less than 2 mm, so as to obtain cut plant fibres characterised by a weight content of fibres with a length of 2 mm to 10 mm greater than 98%.

The invention further relates to a fire-resistant noise insulating wall and to the use of said wall for insulating railways, highways, ways from noises, said walls are suitable for making fire lines. Such fire lines are advantageous for limiting and/or avoiding some damages following a disaster, such as a fire, forestry fire, explosion, etc.

The wall of the invention comprises at least one layer of coated fibres of the invention, as disclosed here above.

According to embodiments of fire resistant and noise insulating wall of the invention, the wall is a wall comprising at least one porous layer containing fungi resistant Poaceae fibres (preferably from the group consisting of the *Miscanthus*-like species, *Pennisetum*-like species, and *Zea*-like species), whereby said fibres are bound by a calcium containing hydraulic binder.

The fungi resistant Poaceae fibres are unpyrolysed fibres (advantageously cut fibres) provided with a silane coating comprising at least OH terminated silanol terminated polydimethylsolxane having a molecular weight comprised between 200 and 1000, and a polyethyleneglycol ether (as well as preferably an amino silane coupling agent, most preferably an aminoethyl aminopropyl trimethoxysilane, an aminoethyl aminopropyl triethoxysilane, and mixtures thereof), the said coated fibres having the following characteristics:

an average length by weight comprised between 2 mm and 20 mm, with a maximum weight content of coated Poaceae fibres with a length lower than 2 mm of less than 5%, advantageously less than 3% of the total weight of coated Poaceae fibres, while the maximum weight content of Poaceae fibres with a length of more than 20 mm is advantageously also lower than 5%, most preferably lower than 3% with respect to the total weight of coated Poaceae fibres (It has been observed that by selecting such coated Poaceae fibres, it was possible to achieve excellent noise insulation characteristics);

a free water weight content of less than 20%, preferably less than 10%, after the hardening of the calcium containing hydraulic binder;

a silane/silicon containing coating with a thickness of less than 10 µm;

long term Alkali resistance, less than 10% by weight of the fibres being dissolved in a 1N NaOH solution at 20° C. after an immersion period of 1 week, or even more. Said resistance can be determined as follows: 100 g fibres of the invention were dried so as to reduce the free water content to 10%. Said dried fibres were soaked in 1 litre of 1N NaOH (aqueous solution) at a temperature of 20° C. for 1 day, 7 days, 14 days, 28 days and 56 days. After the different soaking period, the fibres were collected, washed with water up to achieve a pH of about 7, and dried with hot air at a temperature of 70° C. for 60 minutes. The so dried fibres were then weighed.

Said test is operated for fibres after a storage period of 7 days, for fibres after a storage period of 60 days, and for fibres after a storage period of 180 days.

It was observed that with the coated *Poacea* fibres of the invention, the dry weight of the fibres stored 7 days, 60 days and 180 days was varying in a very limited range (2 to 3%), even for soaking time of 56 days, said dry weight being moreover always greater than 92% (advantageously greater than 95%) of the dry weight of the dry fibres of the invention not soaked in the NaOH solution.)

In order to get advantageous insulation properties, it was observed that at least 50% by weight of the coated Poaceae fibres needs to have an outer surface, whereby at least 10% of said outer surface is not coated with calcium containing hydraulic binder.

The porous layer containing the coated fibres and the calcium containing hydraulic binder has after hardening of the binder the following properties:
  a density (dry) of less than 2000 kg/m$^3$, advantageously lower than 1800 kg/m$^3$, preferably comprised between 600 and 1700 kg/m$^3$;
  a thickness of at least 5 cm, advantageously from 5 cm to 25 cm;
  a dry weight content of coated Poaceae fibres comprised between 10 and 50% by weight;
  an air noise insulation higher than 30 dB, preferably comprised between 30 and 40 dB (measured according to the norm EN 1793-1);
  a lambda value of less than 0.9 W/m·K (measured according to the norm EN 12664);
  reduced water absorption of less than 100% of the weight of the dry coated fibres of the invention, preferably of less than 75%, more preferably comprised between 10% and 50% of the weight of the dry coated fibres (the water absorption can be determined as follows: a) drying of the coated fibres for 1 hour at 100-105° C.; b) weighting of the dried fibres; c) wetting of the fibres, by soaking the fibres in water (20° C.) for 10 minutes; d) removing the excess water by shaking; and e) weighting the wetted fibres. The water absorption is equal to the weight of the wetted fibres minus the weight of the dry fibres. Expressed in % of the dry weight, the water absorption is equal to [the weight of the wetted fibres minus the weight of the dry fibres] divided by the weight of the dry fibres.

inner porosity containing air, said porosity comprising inner channels containing air, whereby said porosity has a volume corresponding to at least 25% of the volume of the porous layer containing the coated Poaceae fibres (the porosity is determined by the BJH method).

Preferably, for at least 50% by weight of the coated fibres, is a portion of the silicon/silane containing coating in contact with air of the inner channels or open channels.

According to advantageous embodiments of the noise insulating layer or wall of the invention, the porous layer or wall has one or more of the following characteristics:
  the open inner channels form an open inner web with a BET specific surface area of at least 20 m$^2$ per dm$^3$ (measured according to the BET method);
  at least 50% by weight of the coated fibres have an outer surface, 25 to 75% of said outer surface being not covered by the calcium containing hydraulic binder;
  the coating consists essentially of aminosilane, polysiloxane (alkylalkoxysilane) and polyethyleneglycol ether;
  the porous layer comprising coated Poaceae fibre comprises an outer face provided with openings which form passages for the inner open channels or inner open web. The outer face of the porous layer is advantageously provided with recesses and/or grooves, whereby the outer face has a developed outer surface of at least 1.5 m$^2$/m$^2$ of undeveloped surface, preferably at least 2 m$^2$ per m$^2$ of undeveloped surface.

The weight ratio silanol terminated polydimethylsiloxane with a molecular weight comprised between 200 and 1000/amino coupling agent is preferably comprised between 5:1 and 20:1.

The fibres are *Miscanthus* fibres, said *Miscanthus* fibres before being treated a silicon being selected in *Miscanthus* fibres having after complete burning at 600° C. an ash characterized by a SiO$_2$ content higher than 30% by weight, advantageously comprised between 30 and 40% by weight, whereby said fibres are treated with said treating aqueous dispersion, so as to enrich the fibres in silicium, so that the ash of the treated fibres after complete burning at 600° C. comprises more than 40% by weight SiO$_2$, especially from 41 to 50% by weight SiO$_2$.

Preferred Poaceae fibres (especially fibres from the *Miscanthus*-like species, *Pennisetum*-like species, and *Zea*-like species) of the invention are fibres enriched in silicon, so that the ash of the fibres after complete burning at 600° C. comprises more than 40% by weight SiO$_2$, especially from 41 to 60% by weight SiO$_2$.

Especially, the ash of the fibres after complete burning at 600° C. are characterized by a weight SiO$_2$ weight content of 41 to 70% (such as from 41 to 50% for *Miscanthus*-like species and 57-70% for *Pennisetum*-like species and *Zea*-like species) and a K$_2$O weight content of 5 to 24% (such as from 18 to 24% for *Miscanthus*-like species, 9 to 10% for *Pennisetum*-like species and 4-5% for *Zea*-like species).

the ash of the fibres after complete burning at 600° C. are characterized by a weight SiO$_2$ content of 41 to 70% and a K$_2$O weight content of 9 to 24%.

The Poaceae fibres have, after complete burning an ash characterized with a SiO$_2$ weight content+K$_2$O weight content advantageously comprised between 68% and 85%.

The selected fibres are advantageously Poaceae fibres when harvested having after complete burning at 600° C. a $P_2O_5$ weight content in the ash comprised between 3 and 7%.

The fibres after being treated with the aqueous treating aqueous dispersion are dried again up to a water content of less than 20% by weight, preferably less than 10% by weight.

The Poaceae fibres (especially fibres from the *Miscanthus*-like species, *Pennisetum*-like species, and *Zea*-like species) of the invention have advantageously a weak acid content of less than 10% by weight and a high polyvalent silicon metal content of more than 0.5% by weight, such as from 1% up to 10% by weight. It is expected that that the treated Poaceae fibres (especially fibres from the *Miscanthus*-like species, *Pennisetum*-like species, and *Zea*-like species) are protected from degradative attacks for the fibre structure, especially in alkaline environments.

At least 90% by weight of the coated Poaceae fibres consist of a first fraction consisting of coated Poaceae fibres with a length comprised between 2 and 6 mm and a second fraction consisting of coated Poaceae fibres with a length comprised between 10 and 20 mm, whereby the weight ratio between the first fraction and the second fraction is comprised between 0.05 and 0.5. By using such a mixture of fibres, it was possible to achieve an improved noise absorption. An air noise absorption of more than 8 dB can be achieved for a porous layer with a thickness of 10 cm. The thicker the layer, the greatest the noise absorption. Lambda value of less than 0.2 W/m·K could be achieved.

The binder comprises further silicon and/or aluminium;

The porous layer has a flame fire resistance at 600° C. of more than 30 minutes (flame penetration fire resistance and flash-over resistance of more than 30 minutes, preferably of more than 60 minutes (according to the Norm NEN6068). The porous layer has also advantageously the following fire resistant characteristics: fire classification according to Norm NEN-EN 13501-1: B1 or better; Euro classification according to Norm NEN-EN 13501 (the layer limits the appearance of dangerous fire situations), limitation of the fire and fume development: Euro classification D or better/fume classification S2 or better, limitation of fire development and limitations of fume spreading (more than 30 minutes according to Norm NEN 6068.

The porous layer has a water absorption of less than 10% of the weight of the porous layer.

The porous coated *Poacea* containing layer has a compressive strength from 8 to 20 $N/mm^2$, a lambda value 0.2 to 1 W/(m·K), and a bending strength from 2 to 10 $N/mm^2$. According to embodiments of the porous layer of the invention, the porous layer has classification C5 to C20 according to NEN-EN 13225.

The porous layer or layers has/have each a thickness from 10 cm to 20 cm.

The coated Poaceae fibres (in particular *Miscanthus* fibres) are products with extremely low $CO_2$ emission and can be considered as $CO_2$ storage products.

About 1.5 up to 2 kg $CO_2$ can be stored in about 1 kg coated fibres. For a layer with a thickness of 10 cm and a weight content of coated Poaceae fibres (specifically *Miscanthus* fibres) of 50%, the long-term $CO_2$ storage is comprised between 25 and 35 kg $CO_2$ per square meter.

The porous layer can be further worked as for other building materials (such as drilling, boring, cutting, graving, etc.). The layer can be finished with plaster coating. Any binding means (such as screw, glue, plug, dowel, etc.) can be used for attaching together several layers and/or for attaching a noise insulating wall of the invention on an existing wall. The height of the wall of the invention can reach up to 4 m or even more.

The wall comprises at least a first porous layer with Poaceae fibres and a second porous layer with Poaceae fibres, whereby the first layer comprises more than 35% by weight coated Poaceae fibres, while the second layer comprises less than 35% by weight coated Poaceae fibres. The first and second porous layers have each preferably a minimum thickness of 6 cm. In an advantageous embodiment, a first porous layer comprises 40 to 55% by weight coated Poaceae fibres (the density of the porous layer is preferably less than 1000 $kg/m^3$, for example between 600 and 900 $kg/m^3$), while the second porous layer comprises 15 to 30% by weight coated Poaceae fibres (The density of the porous layer is preferably comprised between 1200 and 1700 $kg/m^3$). According to another advantageous embodiment, the wall comprises three distinct layers with each different weight content of coated Poaceae fibres. By using different weight content of coated Poaceae fibres, it is possible to achieve an increased air noise absorption.

The porous layer with coated Poaceae fibres is fungi resistant. The characteristics of noise absorption and fire resistance of the porous layer do not substantially vary with the time, even by low temperature such as 0° C. It has been observed that by using fungi resistant coated Poaceae fibres (especially *Miscanthus* fibres), the porous layer was fungi resistant.

The wall comprises two or three distinct porous layers containing each coated Poaceae fibres, whereby the layers are attached together by means of one or more linking means, whereby inner channels of two or three porous layers communicate to each other, possibly through an intermediate open layer or a porous intermediate layer, and whereby the porous layers are placed adjacent to each other in order to form a vertical edge groove or channel and a lateral or vertical edge protuberance, whereby the vertical edge protuberance of one noise insulating is adapted to be inserted into the vertical edge groove of an adjacent noise insulating wall.

A surface of a porous layer containing coated Poaceae fibres forms a first outer face of the noises insulating wall, while a second outer face of noise insulating wall which is opposite to the first outer face is provided with wood elements. For example, the first outer face is directed towards the railways or the ways or roads, the noise of which has to be absorbed.

The invention relates also to the use of a fire resistant noise insulating walls of the invention for protecting railways and ways or roads against fire and noise, whereby the outer face of the walls which is directed towards the railways or roads is the outer face of a porous layer containing coated Poaceae fibres, advantageously Poaceae fibres of the invention.

By using noise insulating walls along railways and ways or roads, it is possible to solve noise problems generated by them. Moreover, fire lines are formed, this is quite advantageous in case of catastrophes or contingencies, for example following forest fires. The railways and ways can in this way be protected from fire.

In the noise insulating wall of the invention coated Poaceae fibres (advantageously fibres of the *Miscanthus* type, of the *Pennisetum* type and *Zea* type) are used, whereby it is possible to predict mechanical properties and/or to achieve better mechanical properties and/or to achieve better workability. The characteristics of the dry coated fabrics do not substantially vary with time, such as for a period of 6 to 9 months or even more. This is advantageous for the production of noise insulating walls, as their properties will not depend of the storage time of the coated fibres.

Details and characteristics of embodiments of the invention will appear from the following description, given as example only. In said embodiments, reference is made to fibres from the *Miscanthus*-like species, *Pennisetum*-like species, and *Zea*-like species as preferred examples of Poaceae fibres, and to plants from the *Miscanthus* species, the *Pennisetum* species and the *Zea* species as preferred examples of the Poaceae plant family.

In said description, reference is made to the attached drawings of preferred embodiments of products (noise insulating and fire resistant) of the invention.

DESCRIPTION OF EXAMPLES AND EMBODIMENTS

1. Preparation of *Miscanthus* Fibres of the Invention, as Preferred Poaceae Fibres Before harvesting *Miscanthus* plant (*Miscanthus sinensis* species), the silicon content and water content thereof were controlled.

The harvesting was operated in April, when the plant had a water content of less than 15% by weight and a $SiO_2$ content in the ash (of plant completely burn at 600° C.) of more than 35% by weight. The so harvested *Miscanthus* fibres had a high weight carbon content, such content measured on dry matter was greater than 40% by weight (such as between 45 and 55%), meaning *Miscanthus* plants are good $CO_2$ sequester.

The harvested *Miscanthus* plant were during the harvesting cut in fibres with a weight average length of about 5 mm Particles and fibres with a size of less than 2 mm were removed from the fibres. The harvested and cut *Miscanthus* plant is preferably not submitted to a grinding step.

The cut *Miscanthus* fibres were placed in a mixing trommel associated to a spray system for spraying on the *Miscanthus* fibres an aqueous composition containing:
- 0.5% by weight alcohol (ethanol)
- 0.5% by weight of OH terminated silanol terminated polydimethylsiloxane with an average molecular weight comprised between 200 and 500;
- 0.05% by weight aminoethyl aminopropyl trimethoxysilane; and
- 0.1% by weight polyethylene glycol trimethylnonyl ether.

Said treatment is operated at room temperature (20° C.) and at atmospheric pressure (1 bar).

The amount of aqueous dispersion added was sufficient so that the treated *Miscanthus* fibres had a $SiO_2$ content in the ash (after complete burning at 600° C.) of more than 45%, such as more than 55%.

After complete burning at 600° C., the ash composition of the so treated fibres was the following:
- Ash content: about 3.2% of the weight of the treated *Miscanthus* fibres before burning
- Silicon content (as $SiO_2$): about 57-58% by weight
- Potassium content (as $K_2O$): about 18-20% by weight
- Phosphor content (as $P_2O_5$): about 5% by weight
- Calcium content (as CaO): about 5% by weight
- Magnesium content (as MgO): about 5% by weight The treated *Miscanthus* fibres (referenced as Misc. Fib. in the examples) were dried (with hot air at 60-80° C.) so that their water weight content was less than 10% (comprised between 5 and 8% by weight).

The treated *Miscanthus* fibres (Misc. Fib.) were stored in an open room with a relative humidity level of 50% and a temperature of 20° C.

After one month storage, no insect attacks, nor fungus development were observed. It seems that the treatment of *Miscanthus* fibres provided to the fibres some extra properties against insects and fungus development. After 6 months storage and even after one year storage, no insect attacks, nor fungus development were observed.

Some of the treated *Miscanthus* fibres were further milled into a powder (with micro fibres) with a size of less than 1 mm, such as comprised between 100 and 500 µm. Said powder was stored in closed container.

After two months storage, as well after 1 year storage, no fungus development was observed on the powder, although untreated *Miscanthus* powder is an excellent medium for the growth of fungi and bacteria.

Coated *Miscanthus* fibres (as preferred example of fibres of the invention) and fresh *Miscanthus* fibres (not provided with the coating) have been tested according to Norm EN 350 in order to measure the durability of the fibres against fungi. After two months testing, the weight reduction for the coated fibres of the invention was less than 5% (with respect to the weight of the coated fibres before testing), while said weight reduction for the fresh cut fibres (not coated) was higher than 20% (with respect to the weight of the fresh cut fibres before testing). According to said norm EN 350, the fibres of the invention (coated *Miscanthus* fibres) have a durability level of 1 on a scale of 1 to 5, meaning substantially no weight loss after a six months testing period.

The so achieved chemically modified *Miscanthus* fibres of the invention with a weight average length of about 5 mm, as well as in powder form, had polyvalent silicon content of more than 1% by weight, a Zero-Span Stability Ratio in 1N NaOH (for up to 28 days) of more than 92%, and a treated fibre alkaline resistance, as well as a stability improvement ratio (TFSAI (V) and (MW)) of more than 1.1 (after soaking time of 28 days in 1N NaOH).

In the same way, as further preferred examples of Poaceae fibres, fibres from *Pennisetum*-like species (such as *Pennisetum purpureum*, also known as Elephant grass, *Pennisetum clandestinum* also known as Kikuyu grass), and *Zea*-like species (such as *Zea mays* species, *Zea mexicana* species) were treated in similar way than for the *Miscanthus* fibres.

Ash content and ash composition of said treated further examples of Poaceae fibres were the following:
- Ash content: more than about 3.1-3.3% of the weight of the treated Poaceae fibres before burning at 600° C.

Silicon content (as $SiO_2$): about 57-60% by weight for *Pennisetum purpureum* and *Pennisetum clandestinum* species, and about 65 to 70% for the *Zea mays* species and the *Zea mexicana* species.

Potassium content (as $K_2O$): about 9-10% by weight for *Pennisetum* species and about 4-5% by weight for the *Zea* species Calcium content (as CaO): about 8-11% by weight Magnesium content (as MgO): less than about 3% by weight The so treated fibres belonging to the Poaceae family had similar storage property and stability properties, as for the treated *Miscanthus* fibres.

When treating fresh *Miscanthus* fibres only with aminosilane or only with OH terminated silanol terminated polydimethylsiloxane, the so treated *Miscanthus* fibres had reduced storage property. It seems that the said combination amino silane with OH terminated silanol terminated polydimethylsiloxane has a synergistic effect on the storage, enabling to keep or maintain mechanical and chemical property of the fibre for storage period of more than 6 months and even more than 1 year.

2. Examples of Use of Treated Poaceae Fibres Such as *Miscanthus* Fibres, *Pennisetum* Fibres and *Zea* Fibres in Building Products The herebelow disclosed examples is described specifically with treated *Miscanthus* fibres.

A. Bricks or Panels

A1. Concrete Blocks or Bricks

For the preparation of said blocks, various hydraulic binders can be used. However, alumino silicate rich hydraulic binders are preferred. The hardening can be operated at room temperature and atmospheric pressure, but is advantageously operated at a temperature of 100° C. to 200° C. (such as 150° C.-180° C.) and under pressure, so as to accelerate the hardening of the bricks. The hardening time can vary, but can be highly reduced when using temperature of 150° C.-180° C.

A first hydraulic binder (given as example only, referenced as H.B. 1 in the example) was achieved by dry mixing 15 kg Portland cement, 15 kg quick lime, 70 kg silica sand and 100 g alumina powder.

Said first hydraulic binder will be mixed with about 60 litres water per 100 kg binder.

A second hydraulic binder was a mix of 30% by weight of Portland cement (average composition comprising by weight: 11% $Ca_3Al_2O_5$; 66% $Ca_3SiO_5$; 13% $Ca_2SiO_4$ and 3.7% $SO_3$) and sulfo alumino cement (average composition comprising by weight: 10.4% $Ca_2SiO_4$; 64.2% $Ca_4(AlO_2)_6SO_4$; 2.4% $CaO,7Al_2O_3$; 2.9% $CaSO_4$).

Said second hydraulic binder will be mixed with about 100 litres water per 100 kg binder.

A first aqueous siloxane/silane dispersion or emulsion (referenced as Disp 1) for improving the water repellence of the product was prepared by mixing together: 3 parts by weight of polysiloxane with units having the following average empirical formula: $CH_3Si(OC_2H_5)_{0.8}O_{1.1}$, with an average molecular weight of 600-700 g and a kinetic viscosity of about 20 $mm^2/s$ (dynamic viscosity of less than 20 mPa·s), 60 parts by weight of isooctyltriethoxysilane, 20 parts by weight isobutyltriethoxysilane, 0.5 part by weight ethanol, water for achieving in total 100 parts by weight. Said first siloxane/silane dispersion is intended to be added to the water at a rate of 0.5 kg per 100 kg water to be mixed with the hydraulic binder.

A second aqueous siloxane/silane dispersion or emulsion (referenced as Disp 2) for improving the water repellence of the product was prepared by mixing together: 1 part by weight of polysiloxane with units having the following average empirical formula: $(CH_3)_{1.2}Si(OC_2H_5)_{1.8}O_{0.5}$, with an average molecular weight of 900-1000 g and a viscosity of about 20 $mm^2/s$ (dynamic viscosity of less than 20 mPa·s), 1 part by weight of polysiloxane with units with the empirical formula: $NH_2(CH_2)_5Si(OC_2H_5)_{0.8}O_{1.1}$ with an average molecular weight of 600-700 g and a kinetic viscosity of about 20 $mm^2/s$ and a dynamic viscosity of less than 20 mPa·s, 1 part by weight of polysiloxane with units having the average empirical formula $(CF_3(CF_2)_5)_{1.2}Si(OC_2H_5)_{1.8}O_{0.5}$ with an average molecular weight of about 900-1000 g and a kinetic viscosity of about 20 $mm^2/s$ and a kinetic viscosity of less than 20 mPa·s, 70 parts by weight of N-octyltriethoxysilane, 0.5 part by weight ethanol, and water for achieving in total 100 parts by weight.

Said second siloxane/silane dispersion is intended to be added to the water at a rate of 0.5 kg per 100 kg water to be mixed with the hydraulic binder.

The dry binder will be mixed with the treated *miscanthus* fibres. The weight rate of *Miscanthus* fibres/dry binder is 10%, 25%, 50%.

After said dry mixing, water (with or without added siloxane/silane dispersion) is added progressively to the mix of binder-*miscanthus* fibres.

The following table gives composition of manufactured bricks, as well as details of processing steps.

| Brick No. | Misc. Fib kg | H.B. 1/2 | Disp 0/1/2 | Water liter | Time Hours or days | Temp ° C. | Press. $10^5$ Pa |
|---|---|---|---|---|---|---|---|
| 1 | 100 | 1 | 0 | 60 | 28 days | room | room |
| 2 | 100 | 1 | 1 | 60 | 12 hours | 180 | 10 |
| 3 | 100 | 1 | 2 | 60 | 12 hours | 180 | 10 |
| 4 | 100 | 2 | 0 | 100 | 28 days | room | room |
| 5 | 100 | 2 | 1 | 100 | 12 hours | 180 | 10 |
| 6 | 100 | 2 | 2 | 100 | 12 hours | 180 | 10 |
| 7 | 50 | 1 | 1 | 130 | 12 hours | 180 | 10 |
| 8 | 50 | 2 | 2 | 160 | 12 hours | 180 | 10 |
| 9 | 200 | 2 | 2 | 160 | 12 hours | 180 | 10 |

Misc. Fib: quantity of treated Miscanthus fibres with a length (average in weight) of about 5 mm added per 100 kg hydraulic binder
H.B.: hydraulic binder H.B. 1 or H.B. 2
Disp 0: No dispersion added
Disp 1: first dispersion added at a rate of 0.5 kg per 100 kg or liter water.
Disp 2: second dispersion added at a rate of 0.5 kg per 100 kg or liter water
Water: volume water added per 100 kg binder
Time: hardening time in days or hours
Temp: temperature for the hardening (room = room temperature or 20° C.)
Press: pressure during the hardening (room = atmospheric pressure)

The bricks (in the shape of cube of 10 cm edge) were shaped in a cubic mould, the lateral sides thereof and the bottom thereof were provided with a thin layer of hydraulic binder without *Miscanthus* fibres of about 0.5 cm. After completing the filing of the mould, a top layer of hydraulic binder without *Miscanthus* fibres was added.

After hardening and cooling, the bricks were tested. It was observed that the bricks had the followings properties:

good thermal insulation, good acoustic insulation, lightweight material, good fire resistance, low water/humidity absorption, compressive strength of more than 2.5 MPpa good resistance against insects/fungi attacks (especially when using Disp ½)

A.2 Panels

Panels were shaped by using the mix of bricks 2, 3 and 5 to 9.

A first layer of the mix hydraulic binder/water/disp 1 or 2 was deposited on a fabric or tissue or a porous paper sheet. Said first layer had a thickness of 2 to 5 mm.

On said bottom layer, a layer (with a thickness comprised between 1 and 5 cm) of the mix 2, 3 and 5 to 9 was deposited.

Thereafter a top coat was deposited with the mix hydraulic binder/water/disp 1 or 2.

The so shaped panel was put in an oven at a temperature of 180° C. for 12 hours.

After hardening and cooling, the panels had the followings properties:
good thermal insulation,
good acoustic insulation,
lightweight material,
good fire resistance,
low water/humidity absorption,
compressive strength of more than 2.5 MPa
good resistance against insects/fungi attacks (especially when using Disp ½)

The *miscanthus* fibres can be used as filler in concrete, and can be added to hydraulic binder with sand, water and aggregates. The content of treated *miscanthus* fibres with respect to the weight content of hydraulic binder will depend of the desired properties.

Figure 1:
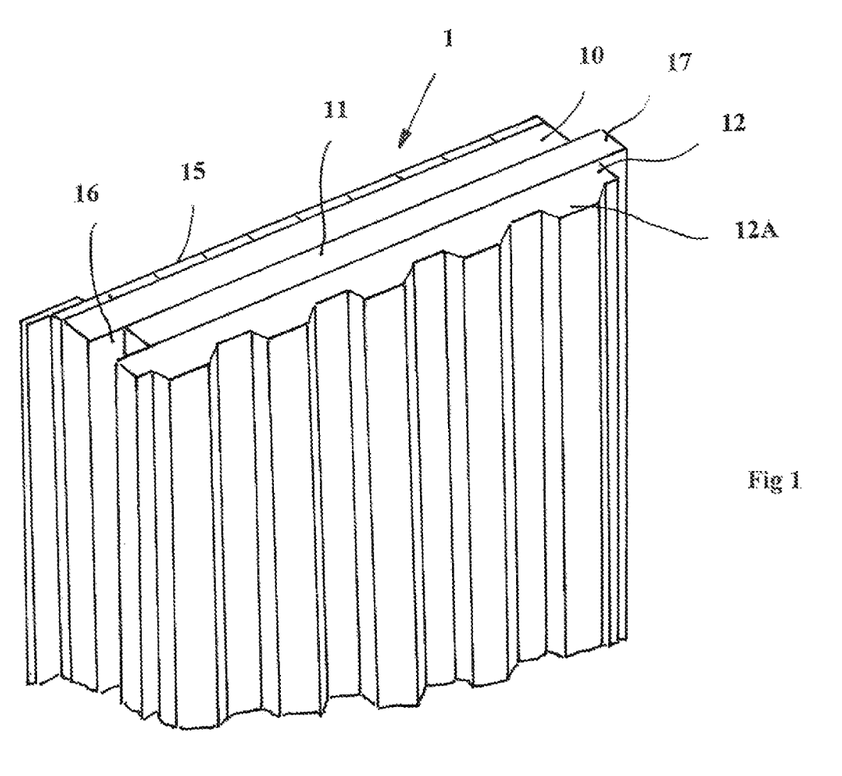
FIG. 1 is a partial perspective view of an embodiment of a noise insulating and fire-resistant wall of the invention.
Figure 2:
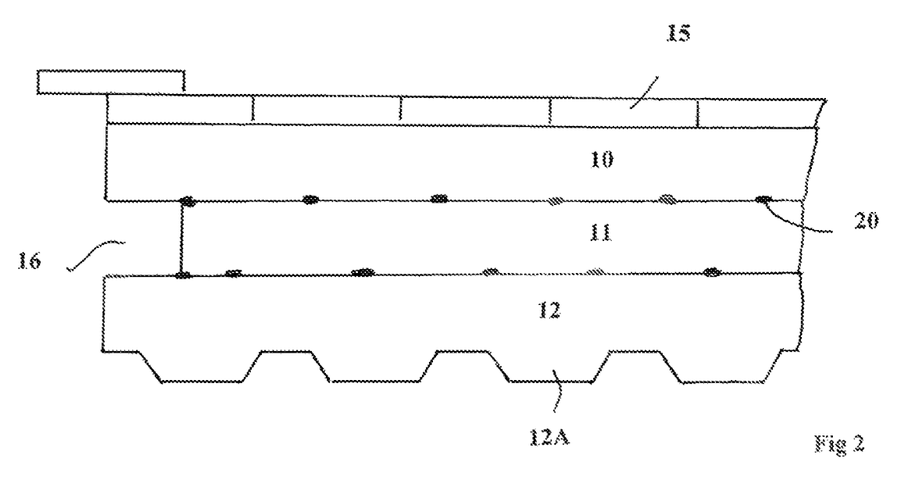
FIG. 2 is a partial cross section view of the wall of FIG. 1.

Specific examples of panel of the invention are noise insulating and fire resistant walls, as disclosed in FIGS. 1 and 2.

The noise insulating wall 1 of FIG. 1 comprises three distinct porous layers 10,11,12 containing coated *Miscanthus* fibres of the invention, each layer having a thickness of at least 6 cm, as well as a wood covering 15.

The outer layer 12 containing coated *Miscanthus* fibres is provided with vertical protuberances 12A, whereby said porous layer has an outer developed are of 2 to 3 m³ per planar square meter. Said porous layer 12 had a maximal thickness of 10 cm, while the protuberance had a thickness of about 4 cm.

The porous layers 10,11,12 have different coated *Miscanthus* content. The layer 10 (directed towards the wood covering 15) comprised 15-20% by weight coated *Miscanthus* fibres and has a density of about 1600-1800 kg/m³.

The porous layer 12 comprised 45-55% by weight coated *Miscanthus* fibres and has a density of about 600-800 kg/m³.

The intermediate porous layer 11 comprised 25-35% by weight coated *Miscanthus* fibres and has a density of about 800-1000 kg/m³.

The layers were attached the one with the other by connecting elements, such as glue points or lines 20. The open inner channels of the porous layers are communicating the one with the other forming an inner open web. Air can flow from channels of a porous layer into channels of another adjacent porous layer.

The intermediate porous layer 11 is placed with respect to the end porous layers 10,12 so as to define on one vertical edge of the panel a vertical groove 16, and on the opposite vertical edge of the panel, a vertical protuberance 17. The vertical protuberance 17 is adapted for being inserted within the vertical groove of an adjacent noise insulating panel.

FIG. 2 is a cross section view of the noise insulating wall of FIG. 1.

Figure 3:
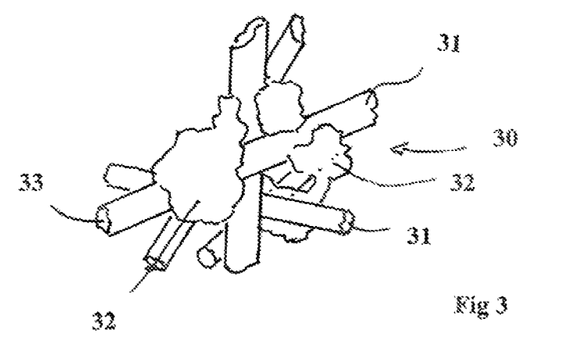
FIG. 3 is a schematic view showing fibres of the invention attached the one to the other by a hydraulic binder.

FIG. 3 is a partial schematic view of coated *Miscanthus* fibres which are attached together by a hardened calcium containing hydraulic binder, such as a binder containing hydrated lime (the binder advantageously also containing some silicon).

The coated *Miscanthus* fibres 30 are substantially completely coated with a silane containing coating 31 as disclosed here above. The cement comprising binder 32 covers only partly the coated *miscanthus* fibres 30, whereby an open web is formed between the fibres and within the inner channels 32 of the fibres.

According to another possible embodiment, the binder is selected to form a MDF panel. The glue comprises a resin glue, which is curable or hardenable at room temperature or at temperature above room temperatures, such as at a temperature comprised between 50 and 150° C. The resin glue can possibly be a resin comprising urea-formaldehyde compounds.

B. Plastic Product Charged with Treated *Miscanthus* Fibres and/or Powder

The treated *miscanthus* fibres were dried in a rotating drum (with air circulation at a temperature below 70° C.) so as to reduce its free water content to less than 5% by weight (such as less than 1% by weight). After drying, the fibres can possibly be partly ground into a powder form (size of less than 100 μm).

The polymer was melted and mixed with the *miscanthus* powder and/or fibres, so as to achieve a substantially uniform dispersion of the *miscanthus* powder and/or fibres in the melted polymer.

The said melted polymer can thereafter be injected or extruded or can be transformed into pellets or granules ready for use in an extruder or injection apparatus.

The polymer is for example polyethylene, polypropylene, PVC, polystyrene, silicon, copolymers, etc.

The *Miscanthus* powder and/or fibres weight content within the plastic can range as example from 5 to 50% with respect to the weight of the polymer.

The fibres can be is required first transformed into aggregates. While not being necessary, the fibres of the invention can be further treated with a mineralizator, especially dry treated with a mineralizator (such as stone dust, hydrated lime (high specific surface area 30 m²/g), etc.)

As further examples of treated Poaceae fibres and powders in bricks, panels and plastics, the treated *Miscanthus* fibres were replaced by treated fibres from *Pennisetum*-like species (such as *Pennisetum purpureum*, also known as Elephant grass, *Pennisetum clandestinum* also known as Kikuyu grass), and treated *Zea*-like species (such as *Zea mays* species, *Zea mexicana* species), as well as a mixture of such Poaceae fibres.

What I claim is:

1. Chemically modified unpyrolyzed ageing resistant fibers selected from the group consisting of *Miscanthus* species, *Pennisetum* species, *Zea* species and mixtures thereof, said fibers having a length comprised between 2 and 100 mm, said ageing resistant fibers having a water content of less than 20% by weight, said ageing resistant fibers having a coating obtained by contacting initial fibers with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and drying said initial fibers contacted with the said treating aqueous dispersion;

whereby said coating of said ageing resistant fibers comprises at least (a) aminosilane bound to silicon atoms present in said ageing resistant fibers and (b) polydimethylsiloxane bound to aminosilane group via a silanol group, whereby the weight ratio between said OH-terminated silanol terminated polydimethylsiloxane having a molecular weight comprised between 200 and 1000 and said amino silane coupling agent of said surface treating mixture is comprised between 5:1 and 20:1, wherein said ageing resistant fibers keeping during a storage period for 6 months in an air environment having a temperature of about 20° C. and a relative humidity of 50%, an alkali resistance in a 1 N NaOH solution for at least 28 days of more than 92%, in which said ageing resistant fibers after complete burning at 600° C. have an ash characterised by a $SiO_2$ weight content comprised between 41% and 70% and a $K_2O$ weight content comprised between 4% and 24%, while the $SiO_2+K_2O$ weight content of said ash is comprised between 68% and 85%.

2. The ageing resistant fibers of claim 1, in which in dry form, 98% by weight of said ageing resistant fibers have a length comprised between 2 and 10 mm.

3. The ageing resistant fibers of claim 1, in which said amino coupling agent is an amino silane coupling agent.

4. The ageing resistant fibers of claim 1, in which said amino coupling agent is an aminoethyl aminopropyl trimethoxysilane.

5. The ageing resistant fibers of claim 1, in which said surface treating mixture further comprises a polyethylene glycol ether.

6. The ageing resistant fibers of claim 5, in which said polyethylene glycol ether is a polyethylene glycol trimethylnonyl ether.

7. The ageing resistant fibers of claim 1, in which said treating aqueous dispersion comprises an alcohol.

8. The ageing resistant fibers of claim 7, in which said alcohol is ethanol.

9. The ageing resistant fibers of claim 1, wherein said ageing resistant fibers comprise *Miscanthus* fibers, whereby, before being treated with said treating aqueous dispersion, said *Miscanthus* fibers are selected from fresh *Miscanthus* fibers having after complete burning at 600° C. an ash characterized by a $SiO_2$ content higher than 30% by weight, whereby said fresh *Miscanthus* fibers after being treated with said treating aqueous dispersion and after being dried, are treated fibers enriched in silicon, so that, after complete burning at 600° C., the ash of said treated fibers enriched in silicon comprises more than 40% by weight $SiO_2$.

10. The ageing resistant fibers of claim 1, in which said ageing resistant fibers comprise *Miscanthus* fibers, whereby, before being treated with said treating aqueous dispersion, said *Miscanthus* fibers are selected from fresh *Miscanthus* fibers having after complete burning at 600° C. an ash characterised by a $SiO_2$ content higher than 30% by weight, whereby said fresh *Miscanthus* fibers after being treated with said treating aqueous dispersion and after being dried, are treated fibers enriched in silicon, so that, after complete burning at 600° C., the ash of said treated fibers enriched in silicon comprises from 55 to 70% by weight $SiO_2$.

11. The ageing resistant fibers of claim 10, in which before being treated with said treating aqueous dispersion, said *Miscanthus* fibers are selected from fresh *Miscanthus* fibers having after complete burning at 600° C. an ash characterized by a $SiO_2$ content comprised between 30 and 40% by weight.

12. The ageing resistant fibers of claim 1, in which said ageing resistant fibers have a TFSAI (MW) and (V) in 1N NaOH solution of more than 1.1 after at least 7 days soaking.

13. The ageing resistant fibers of claim 1, which comprises in dry matter less than 2% by weight of fibers or particles with a size or length of less than 2 mm.

14. The ageing resistant fibers of claim 1, in which in dry form, more than 98% by weight of said ageing resistant fibers have a length comprised between 2 mm and 6 mm.

15. The ageing resistant fibers of claim 1, in which after complete burning at 600° C., the ash of treated fibers corresponds to 3 to 4% by weight of dried treated fibers before their burning, said ash being characterised by a $SiO_2$ weight content comprised between 57% and 70% and by a $SiO_2+K_2O$ weight content comprised between 70% and 78%.

16. The ageing resistant fibers of claim 1, in which said ageing resistant fibers comprise treated *Miscanthus* fibers, in which after complete burning at 600° C., the ash of said treated fibers corresponds to 3 to 3.2% by weight of dried treated fibers before their burning, said ash being characterised by a $SiO_2$ weight content comprised between 57% and 60% and by a $SiO_2+K_2O$ weight content comprised between 70% and 78%.

17. A dry binder mix which is ready to use after addition of water, said mix comprising at least (A) a silicon containing hydraulic binder and (B) chemically modified unpyrolyzed ageing resistant fibers selected from the group consisting of *Miscanthus* species, *Pennisetum* species, *Zea* species and mixtures thereof, said ageing resistant fibers having a length comprised between 2 and 100 mm, said ageing resistant fibers having a water content of less than 20% by weight, said ageing resistant fibers having a coating obtained by contacting initial fibers with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and drying said initial fibers contacted with said treating aqueous dispersion;

whereby said coating of said ageing resistant fibers comprises at least (a) aminosilane bound to silicon atoms present in said ageing resistant fibers and (b) polydimethylsiloxane bound to aminosilane group via a silanol group, whereby the weight ratio between said OH-terminated silanol terminated polydimethylsiloxane having a molecular weight comprised between 200 and 1000 and said amino silane coupling agent of the surface treating mixture is comprised between 5:1 and 20:1, wherein said ageing resistant fibers keeping during a storage period for 6 months in an air environment having a temperature of about 20° C. and a relative humidity of 50%, an alkali resistance in a 1 N NaOH solution for at least 28 days of more than 92%, in which said ageing resistant fibers after complete burning at 600° C. have an ash characterised by a $SiO_2$ weight content comprised between 41% and 70% and a $K_{20}$ weight content comprised between 4% and 24%, while the $SiO_2+K_2O$ weight content of said ash is comprised between 68% and 85%.

18. The mix of claim 17, in which in dry form, more than 98% by weight of said ageing resistant fibers have a length comprised between 2 mm and 10 mm.

19. The mix of claim 17, in which said amino coupling agent is aminoethyl aminopropyl trimethoxysilane.

20. The mix of claim 17, in which said ageing resistant fibers are chemically modified unpyrolyzed *Miscanthus* fibers, whereby, before being treated with said treating aqueous dispersion, said *Miscanthus* fibers are selected from fresh *Miscanthus* fibers having after complete burning at 600° C. an ash characterised by a $SiO_2$ content higher than 30% by weight, whereby said fresh *Miscanthus* fibers after being treated with said treating aqueous dispersion and after being dried, are treated fibers enriched in silicon, so that, after complete burning at 600° C., the ash of the treated fibers enriched in silicon comprises from 55 to 70% by weight $SiO_2$.

21. The mix of claim 20, in which before being treated with said treating aqueous dispersion, the *Miscanthus* fibers are selected from fresh *Miscanthus* fibers having after complete burning at 600° C. an ash characterised by a $SiO_2$ content comprised between 30 and 40% by weight.

22. The mix of claim 17, in which in dry form, more than 98% by weight of said ageing resistant fibers have a length comprised between 2 mm and 6 mm.

23. The mix of claim 17, in which after complete burning at 600° C., the ash of said ageing resistant fibers corresponds to 3 to 4% by weight of dried chemically unpyrolyzed fibers before their burning, said ash being characterised by a $SiO_2$ weight content comprised between 57% and 70% and by a $SiO_2+K_2O$ weight content comprised between 70% and 78%.

24. The mix of claim 1, in which said ageing resistant fibers are chemically modified unpyrolyzed *Miscanthus* fibers, in which after complete burning at 600° C., the ash of said ageing resistant fibers corresponds to 3 to 3.2% by weight of said dried chemically modified unpyrolyzed fibers before their burning, said ash being characterised by a $SiO_2$ weight content comprised between 57% and 60% and by a $SiO_2+K_2O$ weight content comprised between 70% and 78%.

25. A building product comprising at least a part or layer comprising a hardened silicon containing hydraulic binder containing chemically modified unpyrolyzed ageing resistant fibers selected from the group consisting of *Miscanthus* like species, *Pennisetum* species, *Zea* species and mixtures thereof,
wherein said ageing resistant fibers having a length comprised between 2 mm and 100 mm, said ageing resistant fibers having a water content of less than 20% by weight, said ageing resistant fibers having a coating obtained by contacting initial fibers with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and drying said initial fibers contacted with said treating aqueous dispersion;
whereby said coating of said ageing resistant fibers comprises at least (a) aminosilane bound to silicon atoms present in the fibers and (b) polydimethylsiloxane bound to aminosilane group via a silanol group,
whereby the weight ratio between said OH-terminated silanol terminated polydimethylsiloxane having a molecular weight comprised between 200 and 1000 and said amino silane coupling agent of said surface treating mixture is comprised between 5:1 and 20:1, the said ageing resistant fibers keeping during a storage period for 6 months in an air environment having a temperature of about 20° C. and a relative humidity of 50%, an alkali resistance in a 1 N NaOH solution for at least 28 days of more than 92%,
in which said ageing resistant fibers after complete burning at 600° C. have an ash characterised by a $SiO_2$ weight content comprised between 41% and 70% and a $K_{20}$ weight content comprised between 4% and 24%, while the $SiO_2+K_2O$ weight content of said ash is comprised between 68% and 85%.

26. The building product of claim 25, whereby said hardened silicon containing hydraulic binder is a calcium based hydraulic binder.

27. The building product of claim 26, in which before hardening, said calcium based hydraulic binder is mixed with water comprising less than 0.5% by weight of a mixture comprising (a) a polydiethoxysiloxane, and (b) a silane compound selected from the group consisting of butyl triethoxysilane, octyl triethoxysilane and mixture thereof.

28. The building product of claim 27, in which said polydiethoxysiloxane is selected from the group consisting of fluoro alkyl polydiethoxysiloxanes, whereby the alkyl group comprises 1 to 10 carbon atoms.

29. The building product of claim 25, in which said amino coupling agent is aminoethyl aminopropyl trimethoxysilane.

30. The building product of claim 25, in which said ageing resistant fibers are chemically modified unpyrolyzed *Miscanthus* fibers, whereby, before being treated with the treating aqueous dispersion, said *Miscanthus* fibers are selected from fresh *Miscanthus* fibers having after complete burning at 600° C. an ash characterised by a $SiO_2$ content comprised between 30% and 40% by weight, whereby said fresh *Miscanthus* fibers after being treated with said treating aqueous dispersion and after being dried, are treated fibers enriched in silicon, so that, after complete burning at 600° C., the ash of said chemically modified unpyrolyzed *Miscanthus* fibers corresponds to 3 to 3.2% by weight of said dried chemically modified unpyrolyzed *Miscanthus* fibers before their burning, said ash of said dried chemically modified unpyrolyzed *Miscanthus* fibers being further characterised by a $SiO_2$ weight content comprised between 55% and 60% and by a $SiO_2+K_{20}$ weight content comprised between 70% and 78%.

31. The building product of claim 25, in which in dry form, more than 98% by weight of said ageing resistant fibers have a length comprised between 2 mm and 10 mm.

32. A method for the preparation of a building product, said method comprising at least the steps of:
(1) mixing together at least
(A) chemically modified unpyrolyzed ageing resistant fibers selected from the group consisting of *Miscanthus* species, *Pennisetum* species, *Zea* species and mixtures thereof, said ageing resistant fibers having a length comprised between 2 and 100 mm, said ageing resistant fibers having a water content of less than 20% by weight, said ageing resistant fibers having a coating obtained by contacting initial fibers with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and drying said initial fibers contacted with said treating aqueous dispersion;
whereby said coating of said ageing resistant fibers comprises at least (a) aminosilane bound to silicon atoms present in said ageing resistant fibers and (b) polydimethylsiloxane bound to aminosilane group via a silanol group, whereby the weight ratio between said OH-terminated silanol terminated polydimethylsiloxane having a molecular weight comprised between 200 and 1000 and said amino silane coupling agent of said surface treating mixture is comprised between 5:1 and 20:1, wherein said ageing resistant fibers keeping during a storage period for 6 months in an air environment having a temperature of about 20° C. and a relative humidity of 50%, an alkali resistance in a 1 N NaOH solution for at least 28 days of more than 92%, in which said ageing resistant fibers after complete burning at 600° C. have an ash characterised by a $SiO_2$ weight content comprised between 41% and 70% and a $K_2O$ weight content comprised between 4% and 24%, while the $SiO_2+K_2O$ weight content of said ash is comprised between 68% and 85%, (B) a hardenable calcium containing hydraulic binder, and (C) water, to form a hardenable fibers containing mixture; and (2) hardening said hardenable fibers containing mixture at a temperature greater than 20° C.

33. The method of claim 32, which further comprises the step of:

shaping said hardenable fibers containing mixture to form a shaped hardenable fibers containing mixture, before hardening said shaped hardenable fibers containing mixture at a temperature comprised between 100° C. and 250° C. and under a pressure of $3 \times 10^5$ and $20 \times 10^5$ Pa for at least 60 minutes.

34. A method for preparation of chemically modified unpyrolyzed ageing resistant fibers selected from the group consisting of *Miscanthus* species, *Pennisetum* species, *Zea* species and mixtures thereof, said ageing resistant fibers having a length comprised of between 2 mm and 100 mm, said ageing resistant fibers having a water content of less than 20% by weight, said ageing resistant fibers having a coating obtained by contacting initial fibers with a treating aqueous dispersion comprising less than 1% by weight of a surface treating mixture comprising (a) OH-terminated silanol terminated polydimethylsiloxane having a molecular weight comprised between 200 and 1000, and (b) an amino coupling agent, and drying said initial fibers contacted with said treating aqueous dispersion down to a water content of less than 20% by weight;

whereby said coating of said ageing resistant the fibers comprises at least (a) aminosilane bound to silicon atoms present in said ageing resistant fibers and (b) polydimethylsiloxane bound to aminosilane group via a silanol group, whereby the weight ratio between said OH-terminated silanol terminated polydimethylsiloxane having a molecular weight comprised between 200 and 1000 and said amino silane coupling agent of the surface treating mixture is comprised between 5:1 and 20:1, wherein said ageing resistant fibers keeping during a storage period for 6 months in an air environment having a temperature of about 20° C. and a relative humidity of 50%, an alkali resistance in a 1 N NaOH solution for at least 28 days of more than 92%, in which said ageing resistant fibers after complete burning at 600° C. have an ash characterised by a $SiO_2$ weight content comprised between 41% and 70% and a $K_{20}$ weight content comprised between 4% and 24%, while the $SiO_2+K_2O$ weight content of said ash is comprised between 68% and 85%, said method comprising at least the following steps:

determining, after complete burning at 600° C., an average SiO2 content of the ash of at least one sample of fresh fibers containing plant parts from plants selected from the group consisting of *Miscanthus* species, *Pennisetum* species, *Zea* species and mixtures thereof, intended to be harvested, in case the determined average $SiO_2$ content of said ash of said at least one sample of fresh fibers containing plant parts from plants selected from the group consisting of *Miscanthus* species, *Pennisetum* species, *Zea* species and mixtures thereof, is greater than 30% by weight, harvesting fresh fibers containing plant parts;

cutting said fresh fibers containing plant parts into plant fibers with a length comprised between 2 mm and 100 mm;

drying said cut plant fibers at a temperature of less than 75° C., so as to obtain dried plant fibers with a water content of less than 20% by weight;

treating said dried plant fibers with an aqueous dispersion comprising less than 1% by weight of a surface treating mixture comprising OH terminated silanol terminated polydimethylsiloxane having a molecular weight comprised between 200 and 1000, an aminosilane coupling agent, and a polyethylene glycolether, in which the weight ratio between said OH-terminated silanol terminated polydimethylsiloxane having a molecular weight comprised between 200 and 1000 and said amino silane coupling agent of the surface treating mixture is comprised between 5:1 and 20:1, so as to obtain humid coated plant fibers;

drying of said humid coated plant fibers for obtaining said ageing resistant fibers with a water content of less than 20% by weight.

35. The method of claim 34, which comprises a step of cutting said fresh fibers into cut plant fibers with a length of less than 10 mm, and a step for removing from said cut plant fibers, said cut plant fibers with a length of less than 2 mm, so as to obtain cut plant fibers characterised by a weight content of fibers with a length of 2 mm to 10 mm greater than 98%.

* * * * *